(12) United States Patent
Hastings et al.

(10) Patent No.: US 8,040,644 B2
(45) Date of Patent: Oct. 18, 2011

(54) POWER DISTRIBUTION SYSTEM AND ELECTRICAL SWITCHING APPARATUS EMPLOYING A FILTER TRAP CIRCUIT TO PROVIDE ARC FAULT TRIP COORDINATION

(75) Inventors: Jerome K. Hastings, Sussex, WI (US); Xin Zhou, Franklin Park, PA (US); Joseph C. Zuercher, Brookfield, WI (US); Thomas J. Schoepf, Whitefish Bay, WI (US); William E. Beatty, Jr., Beaver, PA (US)

(73) Assignee: Gaton Corporation, Cleveland, OH (US)

( * ) Notice: Subject to any disclaimer, the term of this patent is extended or adjusted under 35 U.S.C. 154(b) by 377 days.

(21) Appl. No.: 12/337,093

(22) Filed: Dec. 17, 2008

(65) Prior Publication Data
US 2010/0149700 A1 Jun. 17, 2010

(51) Int. Cl.
*H02H 3/00* (2006.01)
*H02H 9/08* (2006.01)

(52) U.S. Cl. ............................................. 361/42; 361/2
(58) Field of Classification Search ..................... 361/42, 361/2
See application file for complete search history.

(56) References Cited

U.S. PATENT DOCUMENTS

| | | | |
|---|---|---|---|
| 4,245,318 A | 1/1981 | Eckart et al. | |
| 4,266,259 A | 5/1981 | Howell | |
| 4,631,622 A | 12/1986 | Howell | |
| 4,795,982 A | 1/1989 | Schweitzer, Jr. | |
| 5,185,686 A | * 2/1993 | Hansen et al. | .................. 361/45 |
| 5,224,006 A | 6/1993 | MacKenzie et al. | |
| 5,341,191 A | 8/1994 | Crookston et al. | |
| 5,691,869 A | 11/1997 | Engel et al. | |
| 5,751,524 A | 5/1998 | Swindler | |
| 5,805,397 A | 9/1998 | Mackenzie | |
| 5,910,760 A | 6/1999 | Malingowski et al. | |
| 5,969,921 A | 10/1999 | Wafer et al. | |
| 6,144,271 A | 11/2000 | Mueller et al. | |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,568,072 B2 | 5/2003 | Wilemon et al. | |
| 6,710,688 B2 | 3/2004 | Wellner et al. | |
| 7,292,422 B2 | 11/2007 | Culligan et al. | |

FOREIGN PATENT DOCUMENTS

DE 277 967 C 9/1914
EP 0 318 274 A2 5/1989

* cited by examiner

*Primary Examiner* — Jared Fureman
*Assistant Examiner* — Lucy Thomas
(74) *Attorney, Agent, or Firm* — Martin J. Moran (57) ABSTRACT

An electrical switching apparatus comprises: a first terminal; a second terminal; separable contacts electrically connected between the first terminal and the second terminal; an operating mechanism structured to open and close the separable contacts; and an arc fault trip circuit cooperating with the operating mechanism and structured to trip open the separable contacts responsive to an arc fault condition. An inductor is electrically connected in series between the first terminal and the second terminal. A capacitor includes a first lead electrically connected between the inductor and the second terminal, and a second lead electrically connected to a ground or neutral conductor. The inductor and the capacitor are structured to cooperate with a power circuit impedance downstream of the second terminal to form a filter trap circuit.

11 Claims, 8 Drawing Sheets

POWER DISTRIBUTION SYSTEM AND ELECTRICAL SWITCHING APPARATUS EMPLOYING A FILTER TRAP CIRCUIT TO PROVIDE ARC FAULT TRIP COORDINATION

BACKGROUND

1. Field

The disclosed concept pertains generally to electrical switching apparatus and, more particularly, to electrical switching apparatus, such as arc fault circuit interrupters. The disclosed concept also pertains to power distribution systems including arc fault circuit interrupters.

2. Background Information

Electrical switching apparatus include, for example, circuit switching devices; and circuit interrupters, such as circuit breakers and network protectors. Electrical switching apparatus such as circuit interrupters and, in particular, circuit breakers of the molded case variety, are well known in the art. See, for example, U.S. Pat. No. 5,341,191.

Circuit breakers are used to protect electrical circuitry from damage due to an overcurrent condition, such as an overload condition, a short circuit or another fault condition, such as an arc fault or a ground fault. Molded case circuit breakers typically include a pair of separable contacts per phase. The separable contacts may be operated either manually by way of a handle disposed on the outside of the case or automatically in response to a detected fault condition. Typically, such circuit breakers include an operating mechanism, which is designed to rapidly open and close the separable contacts, and a trip unit, which senses a number of fault conditions to trip the breaker automatically. Upon sensing a fault condition, the trip unit trips the operating mechanism to a trip state, which moves the separable contacts to their open position.

Industrial circuit breakers often use a circuit breaker frame, which houses a trip unit. See, for example, U.S. Pat. Nos. 5,910,760; and 6,144,271. The trip unit may be modular and may be replaceable, in order to alter the electrical properties of the circuit breaker.

It is well known to employ trip units which utilize a microprocessor to detect various types of overcurrent or other fault conditions and provide various protection functions, such as, for example, a long delay trip, a short delay trip, an instantaneous trip, an arc fault trip or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. The arc fault trip function protects the electrical circuit from series and/or parallel arc faults. As implied, the ground fault trip function protects the electrical circuit from faults to ground.

The over current trip coordination between circuit breakers can be achieved by zone interlocking in which a circuit breaker lower in the protection hierarchy sends a fault detection signal to the upstream circuit breaker to temporarily desensitize the trip curve in a region (e.g., short delay) of the upstream circuit breaker, giving the downstream circuit breaker time to respond.

During sporadic arc fault conditions, the root-mean-squared (RMS) value of the fault current is too low to activate the thermal-magnetic trip mechanism. A conventional circuit breaker will therefore not trip. The addition of electronic arc fault sensing to a circuit breaker can provide the protection for a sputtering arc fault. Ideally, the output of an electronic arc fault sensing circuit directly trips (i.e., opens) the circuit breaker. See, for example, U.S. Pat. Nos. 6,710,688; 6,542,056; 6,522,509; 6,522,228; 5,691,869; and 5,224,006.

Arc faults can be series or parallel. Examples of series arcs are: a broken wire where the ends of the broken wire are close enough to cause arcing, or a loose or relatively poor electrical connection. Parallel arcs occur between conductors of different potentials or between the power conductor and a ground. Unlike a parallel arc fault, series arc faults almost never create an increase in current since the fault is in series with the load. In fact, a series arc fault results in a reduction in load current and cannot be detected by the normal overload and overcurrent protection of conventional protection devices. Even the parallel arc, which can draw current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function. In addition, damage from such an effect is aggravated by the concentrated nature of such faults.

A coordinated trip response to fault conditions is desired to assure that the circuit breaker closest to the fault trips opens while the upstream circuit breaker does not trip, thereby minimizing the disturbance to the whole system by isolating the fault.

For arc fault circuit interrupter coordination, it is desired to isolate the arc fault (minimize the system disturbance). However, there is no known coordinated arc fault circuit interrupter that provides arc fault trip coordination between upstream and downstream arc fault circuit interrupters.

There is room for improvement in electrical switching apparatus, such as arc fault circuit interrupters.

There is also room for improvement in power distribution systems including arc fault circuit interrupters.

SUMMARY

These needs and others are met by embodiments of the disclosed concept, which reduce arcing signals originating from zones remote from a power circuit (e.g., without limitation, a downstream secondary branch protected power circuit) while concentrating arcing signals originating from a zone local to the power circuit (e.g., without limitation, a main power circuit; a sub feed power circuit). This enables an electrical switching apparatus closest to an arc fault to trip, while inhibiting a trip in, for example, an upstream feeder circuit breaker or a circuit breaker in a neighboring branch circuit. Hence, this can establish viable and useful arc fault trip coordination between series and parallel connected circuit protection devices, such as, for example, main circuit interrupters and branch circuit interrupters.

The circuit interrupters include an inductor and a capacitor structured to cooperate with a power circuit impedance downstream of a terminal (e.g., a load terminal) to form a filter trap circuit. The filter trap circuit preferably maximizes the arcing signal emanating from an arcing event directly downstream from the circuit interrupter that is closest to the arcing event by sinking those arcing signals to ground or neutral after pulling the same through the sensor of an arc fault trip circuit, and, also, blocks arcing signals from reaching an upstream circuit interrupter or an adjacent circuit interrupter.

As one aspect of the disclosed concept, an electrical switching apparatus comprises: a first terminal; a second terminal; separable contacts electrically connected between the first terminal and the second terminal; an operating mechanism structured to open and close the separable contacts; an arc fault trip circuit cooperating with the operating mechanism, the arc fault trip circuit being structured to trip open the separable contacts responsive to an arc fault condition; an inductor electrically connected in series between the first terminal and the second terminal; and a capacitor including a first lead electrically connected between the inductor and the second terminal, and a second lead electrically connected to a ground or neutral conductor, wherein the inductor and the capacitor are structured to cooperate with a power circuit impedance downstream of the second terminal to form a filter trap circuit.

As another aspect of the disclosed concept, an arc fault circuit interrupter comprises: a first terminal; a second terminal; separable contacts electrically connected between the first terminal and the second terminal; an operating mechanism structured to open and close the separable contacts; an arc fault trip circuit cooperating with the operating mechanism, the arc fault trip circuit being structured to trip open the separable contacts responsive to an arc fault condition; an inductor electrically connected in series between the first terminal and the second terminal; a first capacitor including a first lead electrically connected between the inductor and the second terminal, and a second lead electrically connected to a ground or neutral conductor; and a second capacitor including a first lead electrically connected between the first terminal and the inductor, and a second lead electrically connected to the ground or neutral conductor, wherein the inductor and the first capacitor are structured to cooperate with a power circuit impedance downstream of the second terminal to form a first filter trap circuit, and wherein the inductor and the second capacitor are structured to cooperate with a power circuit impedance upstream of the first terminal to form a second filter trap circuit.

As another aspect of the disclosed concept, an arc fault circuit interrupter comprises: a first terminal; a second terminal; separable contacts electrically connected between the first terminal and the second terminal; an operating mechanism structured to open and close the separable contacts; an arc fault trip circuit cooperating with the operating mechanism, the arc fault trip circuit being structured to trip open the separable contacts responsive to an arc fault condition; an inductor electrically connected in series between the first terminal and the second terminal; a variable capacitance including a first lead electrically connected or electrically connectable between the inductor and the second terminal, and a second lead electrically connected to a ground or neutral conductor; and a self-adapting circuit structured to vary the variable capacitance, wherein the inductor and the variable capacitance are structured to cooperate with a power circuit impedance downstream of the second terminal to form a filter trap circuit having a center frequency, and wherein the self-adapting circuit is further structured to change the center frequency of the filter trap circuit, in order to adapt to changes in a power circuit downstream of the second terminal.

As another aspect of the disclosed concept, a power distribution system comprises: a plurality of different zones; and a plurality of different arc fault circuit interrupters, a number of the plurality of different arc fault circuit interrupters being in each of the different zones, wherein each of a plurality of the plurality of different arc fault circuit interrupters comprises: a first terminal, a second terminal, separable contacts electrically connected between the first terminal and the second terminal, an operating mechanism structured to open and close the separable contacts, an arc fault trip circuit cooperating with the operating mechanism, the arc fault trip circuit being structured to trip open the separable contacts responsive to an arc fault condition, an inductor electrically connected in series between the first terminal and the second terminal, and a capacitor including a first lead electrically connected between the inductor and the second terminal, and a second lead electrically connected to a ground or neutral conductor, wherein the inductor and the capacitor are structured to cooperate with a power circuit impedance downstream of the second terminal to form a filter trap circuit.

As another aspect of the disclosed concept, a detection apparatus comprises: a first terminal; a second terminal; an arc fault detector circuit structured to detect an arc fault condition; an inductor electrically connected in series between the first terminal and the second terminal; and a capacitor including a first lead electrically connected to the inductor and the second terminal, and a second lead electrically connected to a ground or neutral conductor, wherein the inductor and the capacitor are structured to cooperate with a power circuit impedance downstream of the second terminal to form a filter trap circuit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with power distribution systems including three zones and three or more single-phase arc fault circuit breakers, although the disclosed concept is applicable to a wide range of power distribution systems including one or more phases and two or more zones, each of which includes one or more electrical switching apparatus having an arc fault trip circuit.

Figure 1:
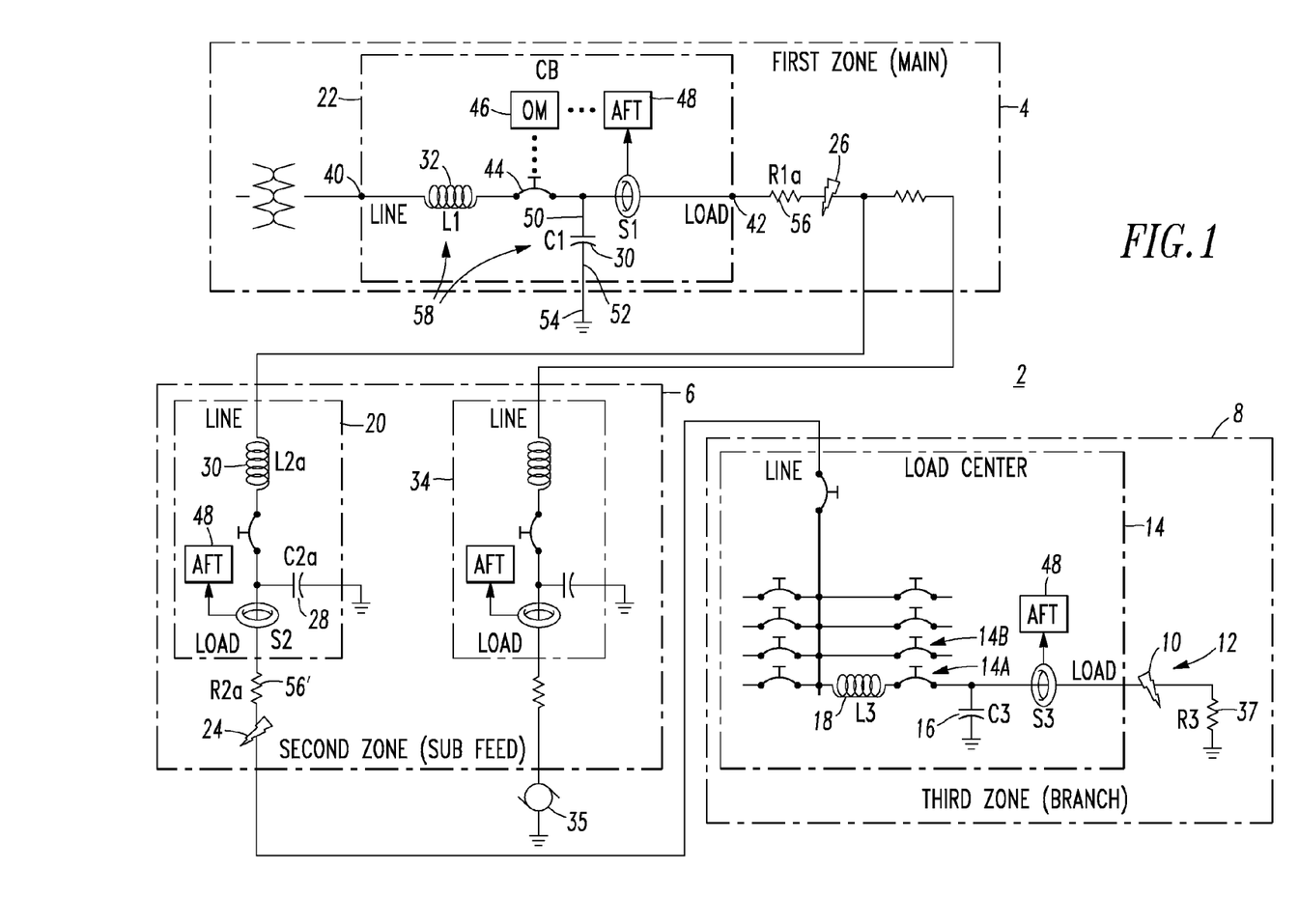
FIG. 1 is a block diagram in schematic form of a power circuit including three zones and a plurality of arc fault circuit interrupters in accordance with embodiments of the disclosed concept.

Referring to FIG. 1, a power circuit 2 is shown including a first (main) zone 4, a second (sub feed) zone 6, and a third (branch) zone 8, it being understood that the disclosed concept is applicable to a wide range of power circuits having two or more different zones. In each of the three example zones 4,6,8, an asymmetric impedance is set by inductive (L) and capacitive (C) components of a corresponding electrical switching apparatus, such as an arc fault circuit interrupter, such as a circuit breaker (CB), and by a resistive (R) component of a corresponding portion of the zone 4,6,8 or power circuit 2. The capacitive (C) component maximizes downstream arcing signals and pulls the same through a corresponding sensor, such as S1, of the first zone 4. Hence, this sinks an arcing signal from the adjacent downstream zone. The inductive (L) component blocks downstream arcing signals from reaching the upstream zones and blocks upstream arcing signals from reaching the downstream zones. A zone, such as 4, begins at a circuit interrupter, such as CB 22. That zone ends at the next circuit interrupter, such as CB 20 or CB 34. The next zone starts, for example, at CB 20 and extends to the next CB, such as 14A, or to a load, such as 35.

For example, an arc fault 10 in the branch circuit feeder 12 of the third zone 8 produces arcing frequencies that are pulled through the branch CB 14A by capacitor C3 16 for proper detection. However, communication of those arcing frequencies is blocked by inductor L3 18, thereby preventing any upstream circuit breakers (e.g., CBs 20,22) from tripping. Also, inductor L3 18 blocks any upstream arcing signals, such as from arc faults 24,26, from reaching the downstream CB 14A. Within the example load center 14 of the third zone 8, all of the circuit breakers, such as 14A,14B, are the same, although only the sensor S3, the inductor L3 18, and the capacitor C3 16 are shown with CB 14A for convenience of illustration. It will be appreciated that other circuit breakers, such as 14B, can have the same or similar circuits, as disclosed herein. The capacitor C3, if located as shown (upstream of the sensor S3) acts to block upstream arcing signals from reaching the sensor S3 while sinking the proper downstream arcing signal through the sensor S3. However, if the load impedance R3 is similar to the impedance presented by C3 at the detection frequency, then some upstream arcing signals could make it through to the sensor S3. The inductor L3 is more effective at blocking unwanted downstream arcing signals from reaching an upstream sensor, such as S2, and blocking upstream arcing signals, such as 24, from reaching the downstream sensor S3.

Similarly, if an arc fault, such as 24, happens in the second zone 6, then the capacitor C2a 28 sinks the arcing signal, in order to trip the circuit breaker 20 in the second zone 6 for proper detection and interruption of the fault. Also, inductor L2a 30 blocks those arcing frequencies from the upstream circuit breaker 22 and blocks any upstream arcing signals from the downstream circuit breakers 20,14A. The combination of the inductance (L) and capacitance (C) is set to block arcing signals, thereby protecting both upstream circuit breakers and downstream circuit breakers from tripping unnecessarily.

A similar filter trap (e.g., a frequency trap) circuit is employed in the main circuit breaker 22 in the first zone 4. If an arc fault, such as 26, happens in the first zone 4, then the capacitor C1 30 sinks the arcing signal, in order to trip the circuit breaker 22 in the first zone 4 for proper detection and interruption of the fault. Also, inductor L1 32 blocks those arcing frequencies from any upstream circuit breaker (not shown) and blocks any upstream arcing signals (not shown) from the downstream circuit breakers 22,20,34,14A.

An arc fault circuit interrupter, such as shown by the example CB 22, includes a first line terminal 40, a second load terminal 42, separable contacts 44 electrically connected between the terminals 40,42, an operating mechanism (OM) 46 structured to open and close the separable contacts 44, and an arc fault trip (AFT) circuit 48 cooperating with the operating mechanism 46. The arc fault trip circuit 48 includes sensor S1 and is structured to trip open the separable contacts 44 responsive to an arc fault condition, such as the example arc fault 26. The inductor (L1) 32 is electrically connected in series between the first line terminal 40 and the second load terminal 42. The capacitor (C1) 30 includes a first lead 50 electrically connected between the inductor 32 and the second load terminal 42 (upstream of sensor S1), and a second lead 52 electrically connected to a ground or neutral conductor 54. The inductor 32 and the capacitor 30 are structured to cooperate with a power circuit impedance, such as the example bus feeder resistance (R1a) 56, downstream of the second terminal 42 to form a filter trap circuit 58.

The filter trap circuit 58 is structured to pass to the arc fault trip circuit 48 a first arcing signal from the arc fault 26 downstream of the second terminal 42 and to block from the arc fault trip circuit 48 a second arcing signal from an arc fault (not shown) upstream of the first terminal 40. For example and without limitation, the first arcing signal may have a frequency of interest in the range of about 100 kHz to about 10 MHz, although the disclosed concept is applicable to a wide range of arcing signal frequencies. The filter trap circuit 58 is preferably structured to maximize signal strength of the downstream arc fault 26 and to minimize signal strength of the arc fault (not shown) upstream of the first terminal 40. For example and without limitation, the inductor (L1) 32 may have an inductance of about 10 µH, and the capacitor (C1) 30 may have a capacitance of about 0.3 µF, although the disclosed concept is applicable to a wide range of inductances and capacitances, and to a wide range of corresponding center frequencies of the filter trap circuit 58.

One consideration with using a single capacitor value, such as C1 30, is that the circuit parameters can influence the signal by attenuating it or, in some cases, amplifying it. Because power circuits, such as 2, can be short or long, and resonances are possible at different times or during different circumstances, it may be desirable to change the capacitor value for optimal performance.

It is intended that a reaction to an arc fault (e.g., 26) within one zone (e.g., zone 4 of the example zones 4,6,8) not be dependent upon its location within that zone. To normalize arcs in such a manner, it is important that arc frequencies of interest (e.g., without limitation, in the range of about 100 kHz to about 10 MHz) be "trapped" within each zone 4,6,8 and be registered on the appropriate circuit interrupter (e.g., the immediately upstream circuit breaker 22 in this example). In such a manner, fault detection and isolation can be made to be correct, accurate and very efficient.

Figure 2:
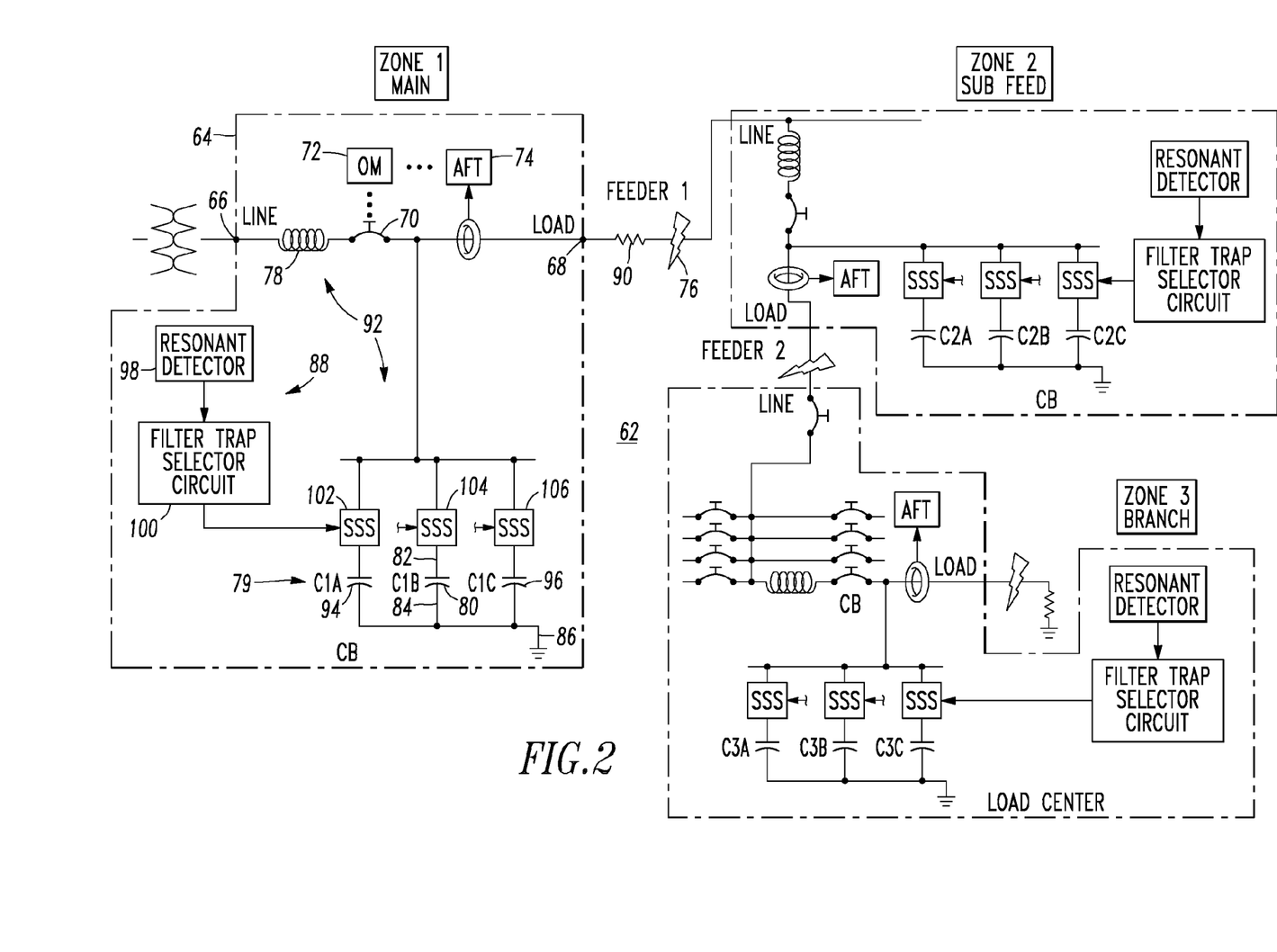
FIG. 2 is a block diagram in schematic form of a power circuit including three zones and a plurality of arc fault circuit interrupters in accordance with another embodiment of the disclosed concept.

Referring to FIG. 2, another power circuit 62 is shown. The power circuit 62 is somewhat similar to the power circuit 2 of FIG. 1, except that it has been simplified and except that different arc fault circuit interrupters, such as the CB 64, are employed, which include a self-adapting circuit 88, and a number of capacitors 79. The example CB 64 includes a first line terminal 66, a second load terminal 68, separable contacts 70 electrically connected between the terminals 66,68, an operating mechanism (OM) 72 structured to open and close the separable contacts 70, and an AFT circuit 74 cooperating with the operating mechanism 72 and being structured to trip open the separable contacts 70 responsive to an arc fault, such as 76.

Suitable arc fault detectors for the AFT circuits 48 (FIG. 1) and 74 (FIG. 2) are disclosed in U.S. Pat. Nos. 6,710,688; 6,542,056; 6,522,509; 6,522,228; 5,691,869; and 5,224,006, which are incorporated herein by reference, although any suitable arc fault detector or circuit interrupter may be employed.

An inductor 78 is electrically connected in series between the first line terminal 66 and the second load terminal 68. A number of capacitors 79 are employed. As shown, there are three example capacitors (C1A,C1B,C1C) 79. Each of the number of capacitors 79, such as (C1B) 80, includes a first lead 82 electrically connected or electrically connectable between the inductor 78 and the second load terminal 68 (upstream of the sensor (not numbered) for AFT 74), and a second lead 84 electrically connected to a ground or neutral conductor 86. The self-adapting circuit 88 is structured to adjust the number of capacitors 79, as will be explained. The inductor 78 and at least one of the number of capacitors 79 are structured to cooperate with system impedance 90 downstream of the second load terminal 68 to form a filter trap circuit 92 having a desired center frequency. The self-adapting circuit 88 is structured to change the center frequency of the filter trap circuit 92, in order to adapt to changes in a power circuit downstream of the second terminal 68 and thereby provide maximum signal strength of arcing conditions.

As shown in FIG. 2, the example number of capacitors 79 is a plurality of different capacitors, such as the example capacitors (CIA) 94, (C1B) 80 and (C1C) 96. The self-adapting circuit 88 is structured to select a number of the plurality of different capacitors 94,80,96 and electrically connect the first lead, such as 82, of the selected number of the plurality of different capacitors 94,80,96 between the inductor 78 and the second load terminal 68. In this example, the self-adapting circuit 88 includes a resonant detector 98 and a filter trap selector circuit 100. Examples of the self-adapting circuit 88 are discussed below in connection with FIG. 7.

Because power circuits, such as 62, can change or are changed over time due to additions or removal of loads and circuits during different circumstances, it is desirable to change the various capacitor values, such as the effective capacitance value of the number of capacitors 79, in order to re-establish optimal performance. In this example, as will be discussed in greater detail, below, in connection with FIG. 7, the self-adapting circuit 88 can accomplish this by ringing the power circuit 62 to determine the impedance parameters. For example, the example resonant detector 98 (e.g., without limitation, a suitable electronic circuit; a suitable processor routine) decides which one (or more) of a plurality of different capacitors, such as one or more of the capacitors 94,80,96, is best suited for the circuit parameters. The desired capacitor is discovered, for example, by a ring down test, and a number of corresponding solid state switches (SSSs) 102,104,106 is commanded to close by the filter trap selector circuit 100. This applies the proper capacitance and ensures that the maximum arcing signal is pulled through the CB 64 associated with that power circuit impedance.

Figure 3:
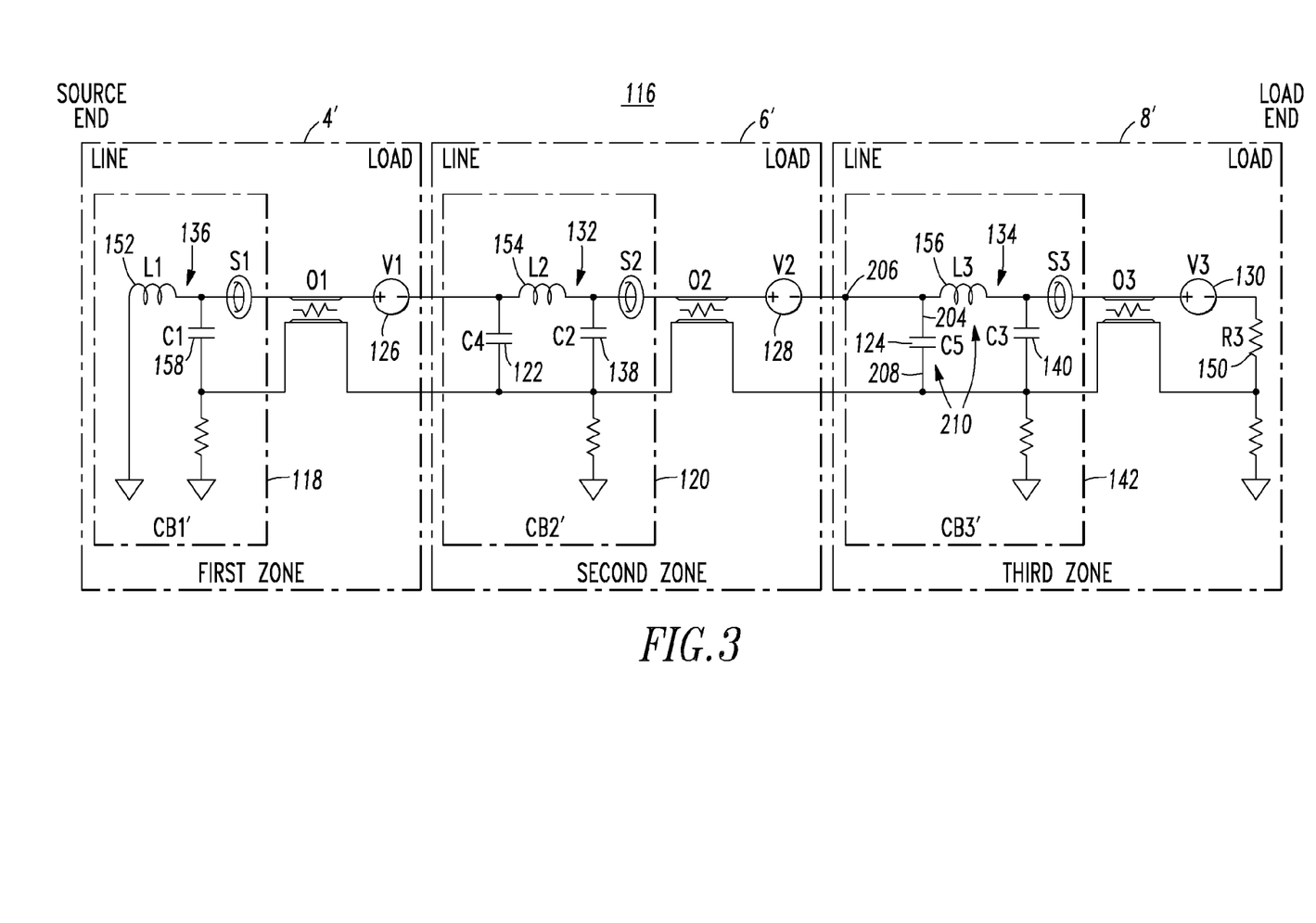
FIG. 3 is a block diagram in schematic form of an equivalent circuit for a power circuit in accordance with another embodiment of the disclosed concept.

Referring to FIG. 3, an equivalent circuit 116 for another power circuit is shown. This power circuit is somewhat similar to the power circuit 2 of FIG. 1, except, for example, that CB2' 120 and CB3' 142 are modified to include an additional capacitor C4 122 and C5 124, respectively, as will be explained. Otherwise, the circuit breakers 120,142 are the same as or similar to the circuit breakers 14A,20,22,34 of FIG. 1. For convenience of illustration, the separable contacts 44 and AFT 48 of FIG. 1 are not shown. Initially, however, the capacitors C4 122 and C5 124 are assumed to be open circuited such that the equivalent circuit could, for example, be for the power circuit 2 of FIG. 1. In the equivalent circuit 116 of FIG. 3, only one fault AC source 126,128,130 is turned on, one at a time, in order to simulate disturbances at various points in the power circuit.

Line length is defined within each transmission line segment, and the example isolation modules 132,134 are a "pi" C-L-C filter circuit (for CB2' 120 and CB3' 142), for example, contained within a corresponding circuit breaker 120,142 and with the current being sensed on the downstream (e.g., to the right in FIG. 3) capacitor C2 138 or C3 140. The C-L-C filter circuit enhances upstream arcing signal blocking and downstream arcing signal strength retention (see, for example, Table 1 versus Table 2, below). The isolation module 136 for CB1' 118 is an L-C filter circuit. Resistor R3 150 is a load resistor for the third zone 8'.

Example 1

Figure 8:
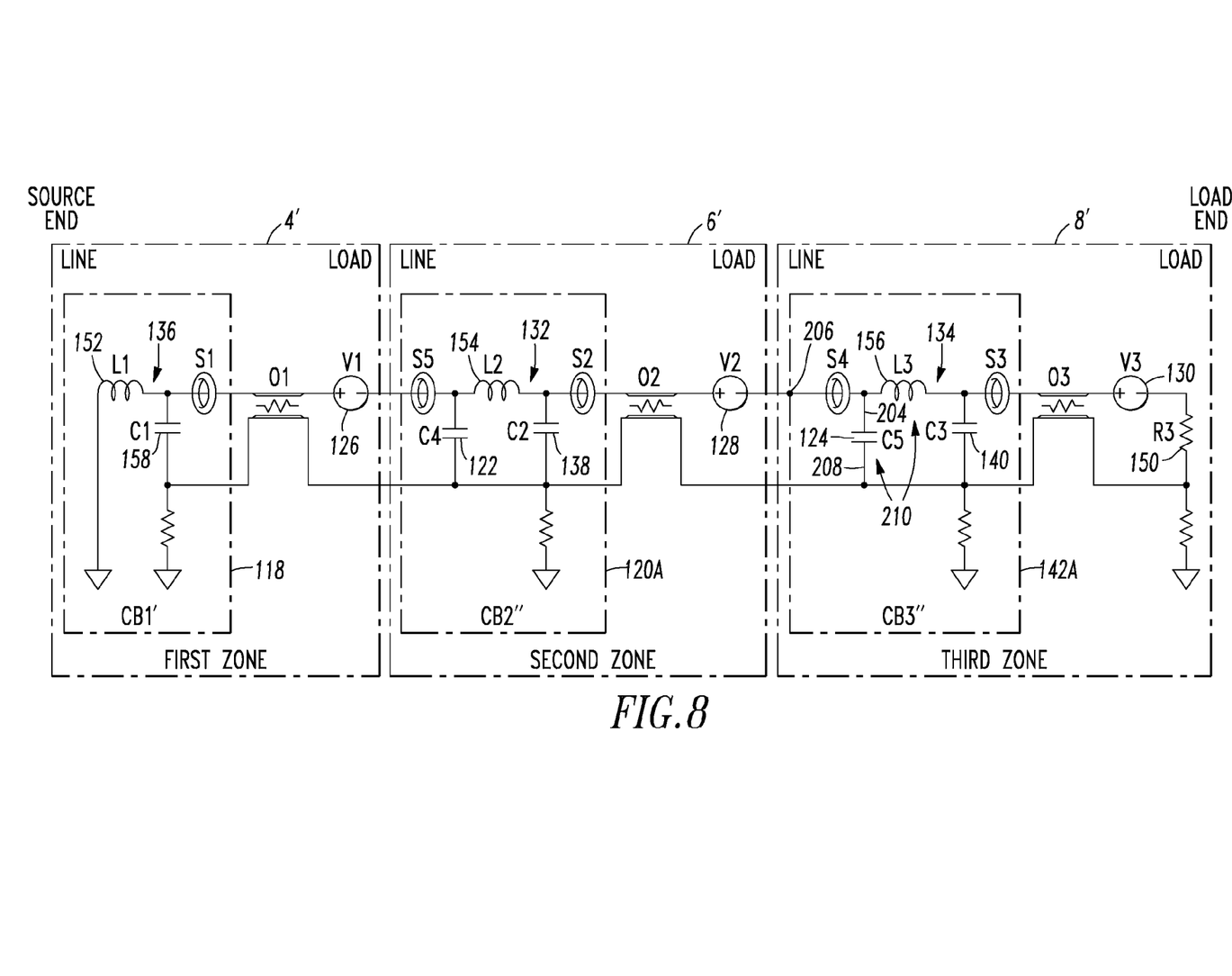
FIG. 8 is a block diagram in schematic form of an equivalent circuit for a power circuit in accordance with another embodiment of the disclosed concept.

As shown in FIGS. 3 and 8, for example, the inductance (L1 152, L2 154, L3 156) is, for example, 10 µH, and the capacitance (C1 158, C2 138, C3 140, C4 122, C5 124) is, for example, 0.3 µF. The transmission line parameters of the zones 4',6',8' are approximated as being 0.04 nF/meter, 0.80 µH/meter and 125 mohm/meter. The lengths O1, O2 and O3 are 20 m, 30 m and 40 m, respectively. The capacitors 158, 138,140 trap the frequencies that are on the AC current waveform due to arcing.

The upstream sensors S4,S5 (FIG. 8) detect arc faults upstream of the corresponding circuit breakers 142A,120A (FIG. 8) from the corresponding zones 8',6', respectively. The downstream sensors S3,S2 detect arc faults downstream of the corresponding circuit breakers 142A,120A from the corresponding zones 8',6', respectively. This provides the benefits of: (1) redundancy of sensors; and/or (2) the possible elimination of similar functionality in an upstream circuit breaker for the purpose of simplification and/or cost efficiency.

Although the filter circuit elements used to maximize or minimize the arc signal have been disclosed to be co-located with corresponding separable contacts, since the C-L-C filter circuit (FIGS. 3 and 8) is symmetric, it will be appreciated that the two sensors S5,S2 or S4,S3 of FIG. 8 can be employed in the following manner. The downstream sensors S2,S3 sense downstream arcs and can be used to operate any co-located separable contacts (not shown, but see the separable contacts 44 and sensor S1 of FIG. 1). The upstream sensors S5,S4 sense upstream faults and can be used to trigger other devices (not shown) by any suitable mechanism (e.g., without limitation, a shunt trip) or to simply provide information to a remote CPU (not shown). The symmetric C-L-C filter circuit advantageously isolates each sensor from erroneous information located on the opposite side of that filter circuit.

Example 2

Figure 4:
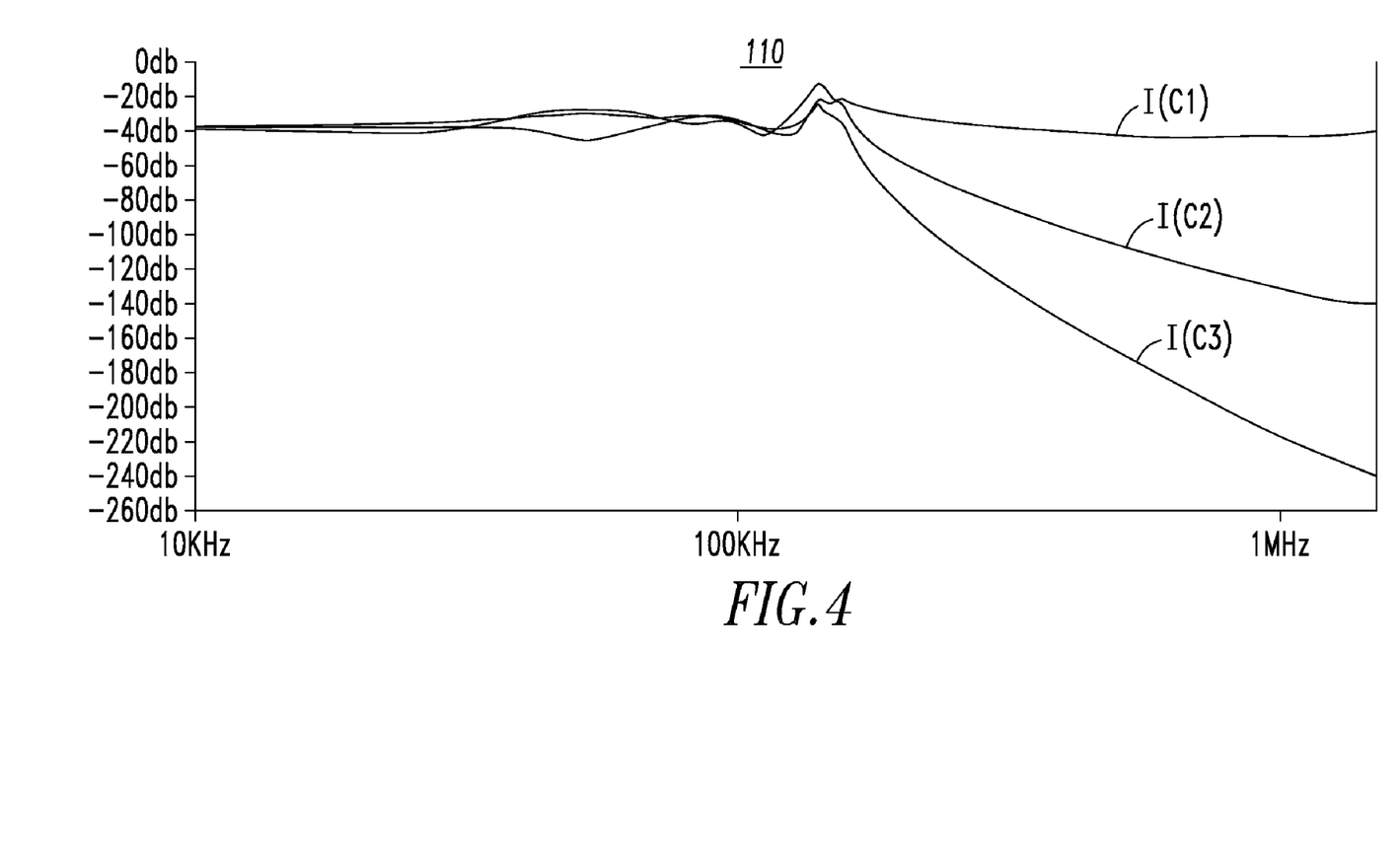
FIG. 4 is a plot of signal magnitude versus frequency for a sensor in the first zone for arcing faults in the three zones of FIG. 3.
Figure 5:
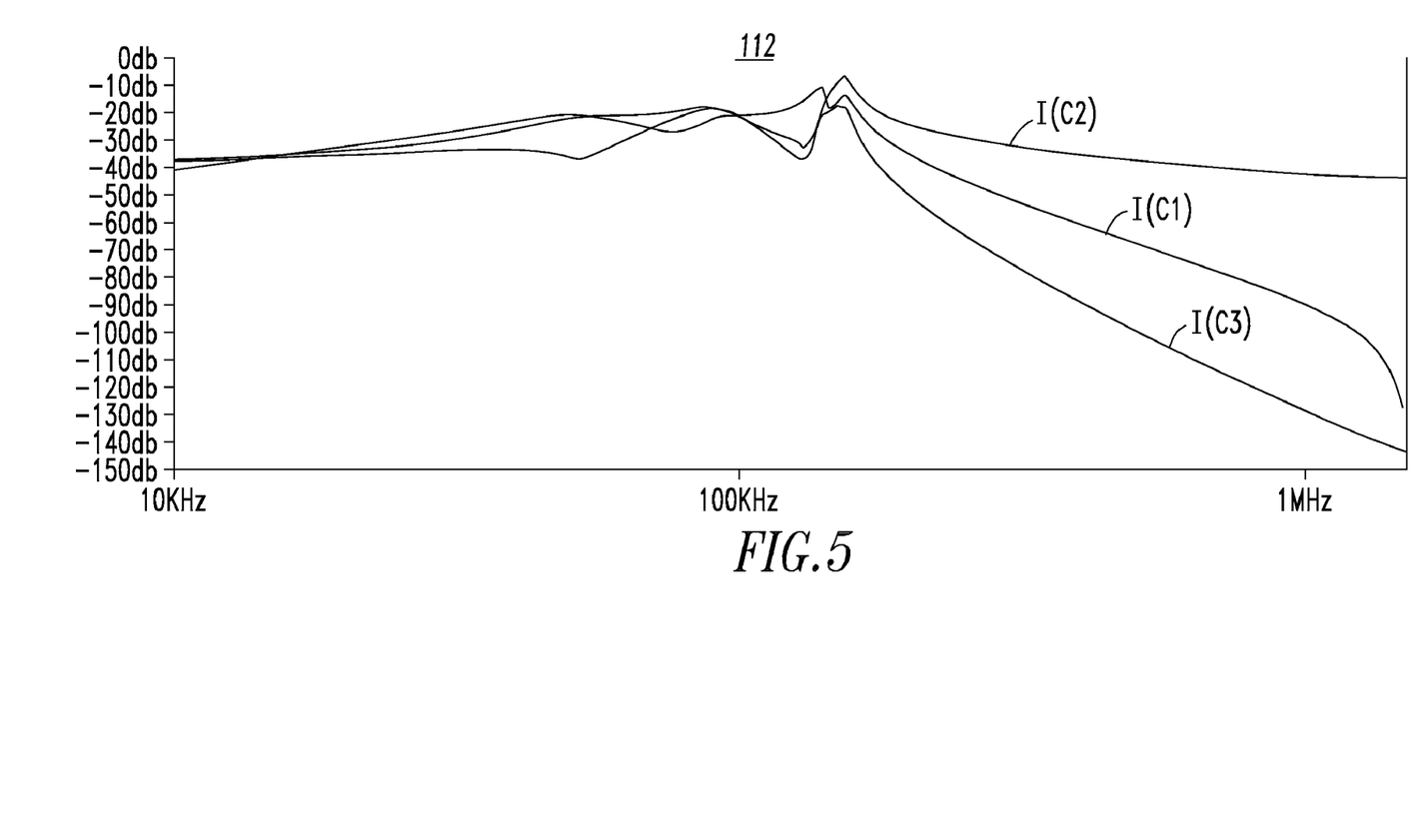
FIG. 5 is a plot of signal magnitude versus frequency for a sensor in the second zone for arcing faults in the three zones of FIG. 3.
Figure 6:
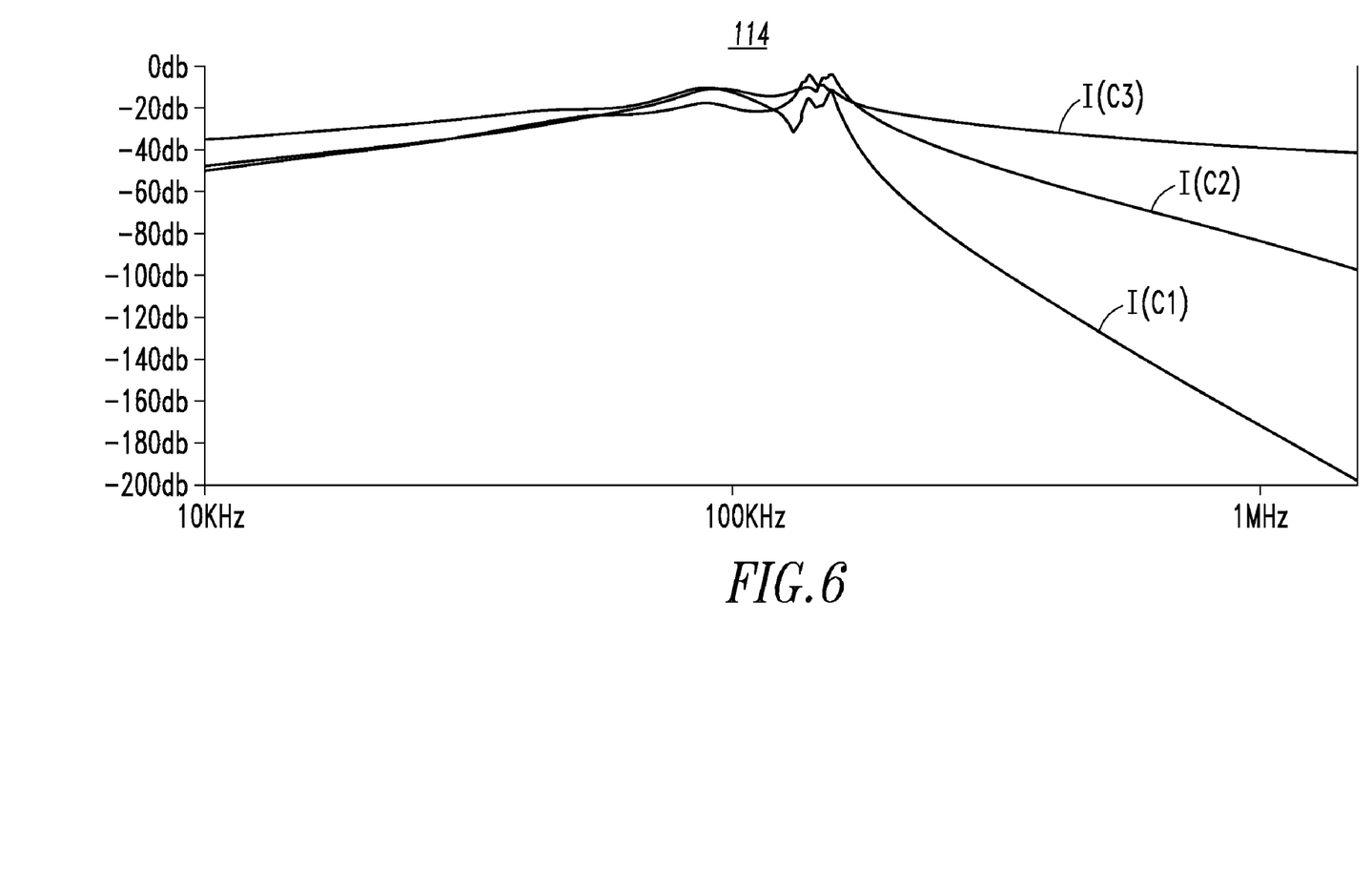
FIG. 6 is a plot of signal magnitude versus frequency for a sensor in the third zone for arcing faults in the three zones of FIG. 3.

FIGS. 4-6 are plots 110,112,114 of the output of a suitable circuit simulation of fault coordination for the equivalent circuit 116 of FIG. 3. The plots 110,112,114 are for the zones 4',6',8', respectively, of FIG. 3. For example, an "AC Analysis" mode permits viewing results over a range of frequencies, as provided by a fault AC source of, for example and without limitation, one volt.

The plots 110, 112 and 114 of respective FIGS. 4, 5 and 6 correspond to an arc in the first zone 4' (with V1 126 activated), the second zone 6' (with V2 128 activated), or the third zone 8' (with V3 130 activated), respectively. Table 1, below, shows the results as evaluated, for example and without limitation, at 500 kHz, wherein the results are expressed in dB with respect to 1 volt.

TABLE 1

| Arc Location | Current through Sensor S1 | Current through Sensor S2 | Current through Sensor S3 |
| --- | --- | --- | --- |
| First Zone 4' (main) | −35 dB | −100 dB | −170 dB |
| Second Zone 6' (submain) | −100 dB | −38 dB | −118 dB |
| Third Zone 8' (branch) | −180 dB | −112 dB | −41 dB |

Table 1 shows the successful isolation of an arc fault in each of the three example zones 4',6',8' for FIG. 3 using C-L-C filter circuits in which the capacitance of C4 equals the capacitance of C2 and the capacitance of C5 equals the capacitance of C3. This includes the signal strength at each circuit interrupter, such as CB1' 118, CB2' 120, CB3' 142, in each zone. The first zone 4' using capacitance C1 158 and sensor S1 has a −35 dB signal (e.g., a relatively strong signal), while the second zone 6' using capacitance C2 138 and sensor S2 has a −100 dB signal (e.g., a relatively weak signal), and the third zone 8' using capacitance C3 140 and sensor S3 has a −170 dB signal (e.g., the relatively weakest signal).

In this example, the power circuit line lengths O1,O2,O3 are selected as being common and typical to a power circuit found in a residential, commercial or industrial setting, about 20 m, 30 m and 40 m (from left to right in FIG. 3), respectively, although any suitable length may be employed. The inductances (L1 152, L2 154, L3 156) (e.g., without limitation, 10 µH) and capacitances (C1 158, C2 138, C3 140) (e.g., without limitation, 0.3 µF) chosen in a given application are affected by additional shunt loads (not shown) and the line lengths present between the circuit interrupters CB1' 118, CB2' 120, CB3' 142 (e.g., without limitation, about 0.04 nF/m, 0.8 µH/m, 125 mohm/m). Dependent on the frequency, line length resonant effects can begin to occur above about ¼ wavelength with a relatively large effect at ½ wavelength (e.g., at about 225 feet of Romex® electrical power wire or power cable).

Table 2, below, shows the results as evaluated, for example and without limitation, at 500 kHz, wherein the results are expressed in dB with respect to 1 volt. This is for the L-C filter circuit of FIG. 3 in which C4 and C5 are open circuited.

TABLE 2

| Arc Location | Current through Sensor S1 | Current through Sensor S2 | Current through Sensor S3 |
| --- | --- | --- | --- |
| First Zone 4' (main) | −38 dB | −80 dB | −120 Db |
| Second Zone 6' (submain) | −77 dB | −40 dB | −83 dB |
| Third Zone 8' (branch) | −115 dB | −78 dB | −42 dB |

It is clear that isolation is achieved but not as completely as indicated in Table 1.

Example 3

Figure 7:
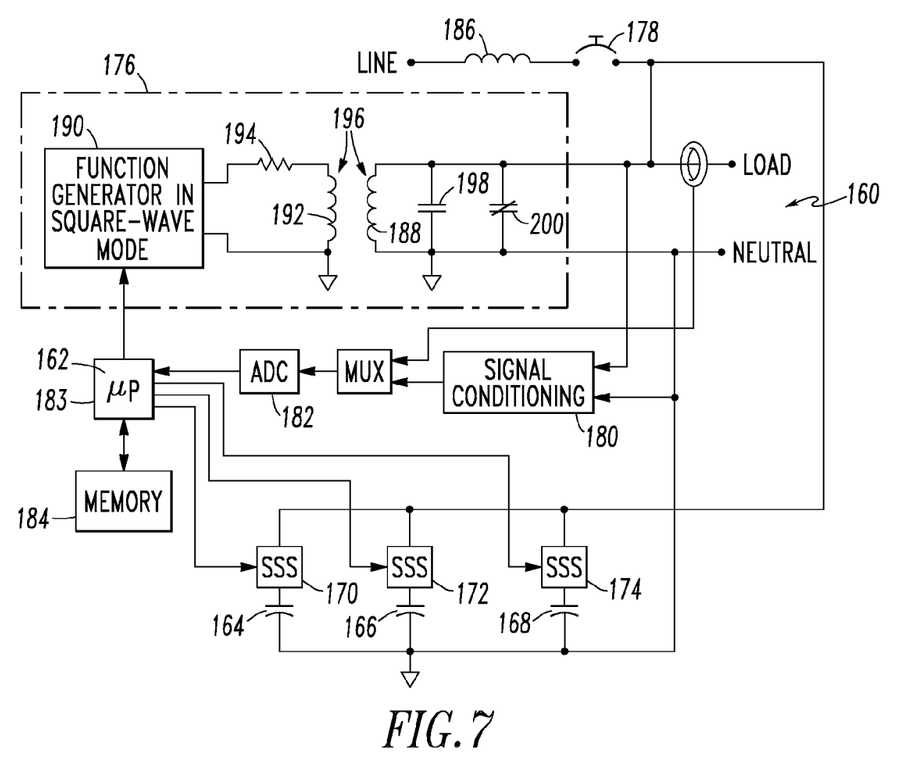
FIG. 7 is a block diagram in schematic form of a portion of one of the circuit interrupters of FIG. 2.

Referring to FIG. 7, an example of the self-adapting circuit 88 (FIG. 2) achieves adaptability for maximum signal strength under changing circuit conditions. The example self-adapting circuit 88 rings the corresponding power circuit 160 to determine the impedance parameters. For example, a suitable electronic circuit (not shown) or a suitable processor routine 162 decides which one (or more) of a plurality of different capacitors 164,166,168 is (are) best suited for the circuit parameters. For example, plural capacitors may be selected and paralleled to provide relatively larger capacitance values. The desired capacitor(s) 164,166,168 is (are) discovered by a ring down test, and the corresponding solid state switch(es) (SSSs) 170,172,174, respectively, is (are) commanded to close. This applies the proper capacitor(s) 164,166,168 and ensures that the proper arcing signal is pulled through the circuit interrupter (e.g., CB 22 of FIG. 1) associated with that power circuit impedance.

A suitable circuit 176 initially applies a step pulse to the power line (i.e., load-to-neutral) of the downstream power circuit 160 of the circuit interrupter (e.g., CB 22 of FIG. 1). The combination of the circuit parameters (e.g., L1 32, C1 30 and R1a 56 of FIG. 1) cause optimal signal strength to occur at some frequency. That frequency defines what capacitance (one or more of capacitor(s) 164, 166 and/or 168) is needed to add downstream (e.g., line-to-neutral) of the separable contacts 178 of the circuit interrupter, in order to both maximize the signal strength from the load side (e.g., to the right of FIG. 7) and, also, block signals from the line side (e.g., to the left of FIG. 7) of the circuit interrupter.

The circuit 176 pulses the power circuit 160 and selects from a plurality of different capacitors 164,166,168 to provide a variable capacitance and obtain the desired capacitance value. The capacitance that produces the highest voltage is the one that is closest to the resonant point. The algorithm of the processor routine 162 includes: (1) ringing the power circuit 160 with the circuit 176; (2) measuring the resulting voltage through the signal conditioning circuit 180 and the analog-to-digital converter (ADC) 182 by the microprocessor (µP) 183; (3) saving the measured voltage in memory 184; (4) comparing the saved voltage to a previously saved highest value and, if higher, then saving the new highest value in memory 184; (5) selecting the next capacitance value from the different capacitors 164,166,168; and (6) repeating steps (1)-(5) until all possible capacitance values are tested. The result is the selection of the best capacitance value for the given power circuit 160 and the corresponding circuit components (e.g., inductor 186 and downstream power circuit impedance (not shown) (e.g., R1a 56 or R2a 56' of FIG. 1)).

Example 4

The following describes a conventional ring down test to ring out an example power circuit, such as 160 of FIG. 7, although any suitable test may be employed. The example circuit 176 includes a tuned inductor 188, which is shock excited by a square wave from a function generator 190 and a relatively small inductor 192. In this circuit 176, the square-wave function generator 190 is electrically connected through a resistor 194 to the relatively small inductor 192. For example and without limitation, inductor 192 can be just a few turns of wire and inductor 188 can include about 30 turns. Inductor 192 is being used here as the primary of a transformer, the secondary of which is the relatively larger inductor 188. Unlike the usual situation in which a transformer (not shown) is driven by a sine-wave source (like a conventional 60 Hz AC power line), here the transformer 196 is driven with a square wave. When the voltage supplied by the square-wave generator 190 changes abruptly, the magnetic flux through inductor 188 changes abruptly and an electromotive force (emf) is generated therein. This abrupt change in the flux through inductor 188 means that it has been shock excited by the function generator 190. The polarity of the emf induced in inductor 188 by the shock excitation is always such that it opposes the change in the flux through that inductor 188. The voltage across the tuned system involving inductor 188 and capacitors 198,200 (and/or a number of the capacitors 164, 166,168) is a ring down—a damped sine wave—as the natural response of this system to the abrupt change in flux caused by the square-wave generator 190.

If the only causes of the removal of energy from the ringing tuned system (inductor 188 and capacitors 198,200 (and/or a number of the capacitors 164,166,168)) were intrinsic to the tuned system itself, then a measurement of the time required for the amplitude of the ring down to fall from some value to one-half that value would give a very accurate measurement of the Q of the tuned system. The time thus measured is called the half-amplitude decay time and is denoted by the symbol $\tau_{1/2}$. However, in addition to losses that are associated only with the tuned system (chiefly the resistance of the wire used to wind inductor 188), some energy is always removed from the ringing tuned system by dissipation in the circuit containing resistor 194 and inductor 192. The removal of energy from inductor 188 by the circuit containing the resistor 194 and the inductor 192 is due to the fact that the inductor 192 is always linked to inductor 188 by magnetic flux, such that those two coils are inductively coupled. As the tuned system "rings", some amount of energy is transferred from inductor 188 to inductor 192, and some fraction of this energy is lost by dissipation in resistor 194 and in the unavoidable resistance of the windings of inductor 192.

Example 5

In FIG. 3, it will be appreciated that the capacitor (C5) 124 includes a first lead 204 electrically connected between the line terminal 206 and the inductor 156, and a second lead 208 electrically connected to a ground or neutral conductor (not expressly shown, but see the conductor 54 of FIG. 1). The inductor 156 and the capacitor 124 are structured to cooperate with a power circuit impedance (not shown) upstream of the line terminal 206 to form a filter trap (e.g., a frequency trap) circuit 210. For example, the filter trap circuit 210 can have a center frequency in the range of about 100 kHz to about 10 MHz, although the disclosed concept is applicable to a wide range of arcing signal frequencies. For example and without limitation, the inductor 156 may have an inductance of about 10 µH, and the capacitor 124 may have a capacitance of about 0.3 µF, although the disclosed concept is applicable to a wide range of inductances and capacitances. It will be appreciated that the capacitor (C4) 122 functions in a manner similar to the capacitor (C5) 124.

Example 6

Simplification of the disclosed C-L-C filter circuit is possible, for example, within a load center. Within a load center, such as 14 of FIG. 1, which contains a plurality of (e.g., branch) circuit breakers in relatively close proximity, such as 14A,14B, it is possible to consolidate an upstream capacitor, such as C5 124 (FIG. 3), as a single capacitor across all such proximate circuit breakers, such as 14A,14B, in order that the upstream capacitor, such as C5 124, is only employed by one circuit breaker, such as 14A, and is not required by the number of other circuit breakers, such as 14B. This still permits the advantages of the C-L-C filter circuit of FIG. 3 to be achieved in all of the circuit breakers 14A,14B of the common load center 14. Hence, this permits simplification of the other circuit breakers, such as 14B.

Example 7

Since capacitor C4 122 (or C5 124) in FIG. 3 has the same current magnitude as capacitor C2 138 (or C3 140) at higher frequencies, as is shown in FIG. 8, it is possible for one circuit breaker, with two sensors (e.g., CB3" 142A has a downstream sensor S3 and an upstream sensor S4; CB2" 120A has a downstream sensor S2 and an upstream sensor S5), to detect arc currents in both the upstream and downstream zones, which can be beneficial in limiting the number of specialty circuit interrupters employed, and in providing redundancy in multiple zone applications. Except for the sensors S4 and S5, the respective circuit interrupters CB3" 142A and CB2" 120A may be the same as or similar to the respective interrupters CB3' 142 and CB2' 120 of FIG. 3, which except for the capacitors C5 124 and C4 122, may be the same as or similar to the circuit interrupters 14A,20,34,22 of FIG. 1. In FIG. 8, each of the sensors S4 and S5 uses a corresponding AFT circuit (not shown) or each sensor S4,S5 is alternately employed by one AFT circuit (not shown) for its signal.

Example 8

This example can be employed to achieve suitable sensitivity differences in the L-C filter circuit, as will be described. A power distribution system, such as the power circuit 2 of FIG. 1, the power circuit 62 of FIG. 2, or a power circuit (not shown) represented by the power circuit equivalent circuit 116 of FIG. 3, includes a plurality of different zones, such as zones 4, 6, and 8 of FIG. 1, and a plurality of different arc fault circuit interrupters, such as respective circuit breakers 22, 20 and 34, and 14A of FIG. 1. As such, a number of the plurality of different arc fault circuit interrupters 22,20,34,14A are in each of the different zones 4,6,8. Although three example zones 4,6,8 are shown, there may be two different zones, or there may be four or more different zones.

Adding the inductor (e.g., L1 32) and the capacitor (e.g., C1 30) in a specific value allows the corresponding circuit breaker (e.g., CB 22) to be relatively more or less sensitive to arcing events and arcing energy. Therefore, this can make relatively lower rated circuit breakers (e.g., in downstream zones) relatively more sensitive (e.g., by using relatively larger capacitances) to relatively lower current arcs, and relatively higher rated circuit breakers (e.g., in upstream zones) relatively less sensitive (e.g., by using relatively smaller capacitances), while retaining the benefit of zone coordinated arc fault protection. The capacitor (e.g., C1 30) can also be selected (as was discussed above in connection with FIG. 2) for optimal signal strength if the load impedance changes due to modifications to the load circuit.

Example 9

Although FIG. 1 shows the separable contacts 44 disposed between the inductor 32 and the capacitor 30 of the L-C filter circuit, the separable contacts 44 can also be disposed upstream of the inductor 32 (i.e., left of the inductor 32 in FIG. 1) or between the capacitor 30 and the sensor S1 (i.e., right of the node between the separable contacts 44 and the capacitor 30, but left of the sensor S1 in FIG. 1). The sensor S1 can be located either upstream or downstream from the separable contacts 44. Preferably, the sensor S1 is downstream from the separable contacts 44 (i.e., right of the separable contacts 44 in FIG. 1).

Example 10

Somewhat similar to Example 9, for the C-L-C filter circuit of FIG. 3, the separable contacts (not shown, but see the separable contacts 44 of FIG. 1) can be disposed between the capacitor 122 and the inductor 154 (i.e., right of the node shared by the inductor 154 and the capacitor 122 and in series with the inductor 154), between the inductor 154 and the capacitor 138 (i.e., left of the node shared by the inductor 154 and the capacitor 138 and in series with the inductor 154), or between the capacitor 138 and the sensor S2 (i.e., right of the node shared by the inductor 154 and the capacitor 138, but left of the sensor S2 and in series with the inductor 154). The sensor S2 can be located either upstream or downstream from the separable contacts. Preferably, the sensor S2 is downstream from the separable contacts (i.e., right of the separable contacts 44 in FIG. 1).

Example 11

In FIG. 1, the branch circuit breakers 14A,14B are located proximate each other within the load center 14. A first filter trap circuit formed by inductor 18 and capacitor 16 of the branch circuit breaker 14A provides arc fault signal isolation from another one of the branch circuit breakers, such as 14B. Similarly, a second filter trap circuit (not shown, but see the filter trap circuit formed by inductor 18 and capacitor 16 of the branch circuit breaker 14A) of the branch circuit breaker 14B provides arc fault signal isolation from the other branch circuit breakers, such as 14A.

Example 12

Although circuit breakers 14A,20,22,34,64,118,120,142 are disclosed, it will be appreciated that the disclosed concept is also applicable to detection apparatus, such as for example and without limitation, an arc fault detector circuit for a circuit breaker, or a trip unit for a circuit breaker.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power distribution system comprising:
a plurality of different zones; and
a plurality of different arc fault circuit interrupters, a number of said plurality of different arc fault circuit interrupters being in each of said different zones,
wherein each of a plurality of said plurality of different arc fault circuit interrupters comprises:
a first terminal,
a second terminal,
separable contacts electrically connected between said first terminal and said second terminal,
an operating mechanism structured to open and close said separable contacts, an arc fault trip circuit cooperating with said operating mechanism, said arc fault trip circuit being structured to trip open said separable contacts responsive to an arc fault condition,
an inductor electrically connected in series between said first terminal and said second terminal, and
a capacitor including a first lead electrically connected between said inductor and said second terminal, and a second lead electrically connected to a ground or neutral conductor,
wherein said inductor and said capacitor are structured to cooperate with a power circuit impedance downstream of said second terminal to form a filter trap circuit,
wherein said arc fault trip circuit comprises a sensor structured to sense current flowing between said second terminal and said capacitor; and wherein said filter trap circuit is structured to concentrate a first arcing signal to the sensor of said arc fault trip circuit from a first arc fault condition in a first one of said different zones downstream of said second terminal and to reduce a second arcing signal to the sensor of said arc fault trip circuit from a second arc fault condition in a second one of said different zones upstream of said first terminal.

2. The power distribution system of claim 1 wherein said plurality of different zones is two different zones.

3. The power distribution system of claim 1 wherein said plurality of different zones is at least three different zones.

4. The power distribution system of claim 1 wherein responsive to said first arcing signal from the first one of said different zones downstream of said second terminal, said capacitor sinks said first arcing signal.

5. The power distribution system of claim 1 wherein responsive to said second arcing signal from the second one of said different zones upstream of said first terminal, said inductor blocks said second arcing signal from the sensor of said arc fault trip circuit and, also, blocks said first arcing signal from a sensor of an arc fault trip circuit of the second one of said different zones upstream of said first terminal.

6. The power distribution system of claim 1 wherein said capacitor is a first capacitor; and wherein said arc fault trip circuit of at least one of said different arc fault circuit interrupters comprises a second capacitor including a first lead electrically connected between said first terminal and said inductor, and a second lead electrically connected to said ground or neutral conductor.

7. The power distribution system of claim 6 wherein said sensor is a first sensor; wherein said arc fault trip circuit further comprises said first sensor structured to sense current flowing between said second terminal and said first capacitor and a second sensor structured to sense current flowing between said first terminal and said second capacitor.

8. The power distribution system of claim 6 wherein in one of said different zones, said number of different arc fault circuit interrupters are a plurality of branch circuit breakers being located proximate each other within a load center; wherein said at least one of said different arc fault circuit interrupters is only one of said plurality of branch circuit breakers; and wherein the others of said plurality of branch circuit breakers do not include said second capacitor.

9. The power distribution system of claim 1 wherein a first one of said plurality of different arc fault circuit interrupters in a first one of said different zones comprises said inductor having a first inductance and said capacitor having a first capacitance; and wherein a different second one of said plurality of different arc fault circuit interrupters in a different second one of said different zones comprises said inductor having a second inductance, which is different than said first inductance, and said capacitor having a second capacitance, which is different than said first capacitance.

10. The power distribution system of claim 1 wherein in one of said different zones, said number of different arc fault circuit interrupters are a plurality of branch circuit breakers being located proximate each other within a load center;

wherein a first filter trap circuit of a first one of said branch circuit breakers provides arc fault signal isolation from a second one of said branch circuit breakers; and wherein a second filter trap circuit of said second one of said branch circuit breakers provides arc fault signal isolation from said first one of said branch circuit breakers.

11. The power distribution system of claim 1 wherein said power circuit impedance is electrically connected in series with said first terminal, said separable contacts and said second terminal, and is between said second terminal and a load powered by said power distribution system.

* * * * *

UNITED STATES PATENT AND TRADEMARK OFFICE
CERTIFICATE OF CORRECTION

| | | |
|---|---|---|
| PATENT NO. | : 8,040,644 B2 | Page 1 of 1 |
| APPLICATION NO. | : 12/337093 | |
| DATED | : October 18, 2011 | |
| INVENTOR(S) | : Jerome K. Hastings et al. | |

It is certified that error appears in the above-identified patent and that said Letters Patent is hereby corrected as shown below:

Front Page, Column 1, Line 73, "Gaton" should read --Eaton--.

Signed and Sealed this
Third Day of January, 2012

David J. Kappos
*Director of the United States Patent and Trademark Office*

UNITED STATES PATENT AND TRADEMARK OFFICE
CERTIFICATE OF CORRECTION

PATENT NO.         : 8,040,644 B2
APPLICATION NO.    : 12/337093
DATED              : October 18, 2011
INVENTOR(S)        : Jerome K. Hastings et al.

Page 1 of 1

It is certified that error appears in the above-identified patent and that said Letters Patent is hereby corrected as shown below:

Title Page, Item (73) Assignee, "Gaton" should read --Eaton--.

This certificate supersedes the Certificate of Correction issued January 3, 2012.

Signed and Sealed this
Thirty-first Day of January, 2012

David J. Kappos
*Director of the United States Patent and Trademark Office*